United States Patent [19]
Hickman

[11] Patent Number: 5,610,992
[45] Date of Patent: Mar. 11, 1997

[54] PORTABLE ELECTRONIC DEVICE HAVING A PORTED SPEAKER ENCLOSURE

[75] Inventor: Scott N. Hickman, Corvallis, Oreg.

[73] Assignee: Hewlett-Packard Company, Palo Alto, Calif.

[21] Appl. No.: 405,677

[22] Filed: Mar. 17, 1995

[51] Int. Cl.$^6$ .................................................. H04R 25/00
[52] U.S. Cl. ............................ 381/188; 381/24; 381/205
[58] Field of Search .............................. 381/154, 88, 159, 381/188, 205, 24; 181/198, 199

[56] References Cited

U.S. PATENT DOCUMENTS

| | | | |
|---|---|---|---|
| 4,512,434 | 4/1985 | Yoo | 381/89 |
| 4,567,959 | 2/1986 | Prophit | 381/86 |
| 4,727,583 | 2/1988 | Weber | 381/159 |
| 4,837,837 | 6/1989 | Taddeo | 381/159 |
| 4,928,778 | 5/1990 | Tin | 180/167 |
| 5,025,885 | 6/1991 | Froeschle | 381/154 |
| 5,241,695 | 8/1993 | Roshitsh et al. | 455/128 |
| 5,265,274 | 11/1993 | Knutson et al. | 381/188 |

FOREIGN PATENT DOCUMENTS

| 0087898 | 3/1990 | Japan | 381/159 |
|---|---|---|---|

OTHER PUBLICATIONS

Richard H. Small, Closed Box Loudspeaker Systems Part II: Synthesis, Journal Of The Audio Engineering Society, vol. 21, No. 1, pp. 11–18 (Jan./Feb. 1973).
Richard H. Small, Vented Box Loudspeaker Systems Part I: Small–Signal Analysis, Journal Of The Audio Engineering Society, vol. 21, No. 5, pp. 363–372 (Jun. 1973).
Richard H. Small, Vented Box Loudspeaker Systems Part II: Large–Signal Analysis, Journal Of The Audio Engineering Society, vol. 21, No. 6, pp. 438–444 (Jul./Aug. 1973).

(List continued on next page.)

*Primary Examiner*—Curtis Kuntz
*Assistant Examiner*—Rexford Barnie
*Attorney, Agent, or Firm*—Curtis G. Rose

[57] ABSTRACT

A portable electronic device, such as a portable personal computer, has a ported speaker enclosure. The ported speaker enclosure has a speaker having a front portion and a back portion, where the front portion of the speaker forms a seal with a top surface of the portable electronic device, and the back portion of the speaker is contained in the ported speaker enclosure. An acoustic insulator, such as a gasket, is disposed between the top surface of the portable electronic device and the bosom surface of the ported speaker enclosure, thereby forming one chamber portion on one side of the acoustic insulator and a second chamber portion on the other side of the acoustic insulator. The acoustic insulator has a gap which allows for sound to travel from the first chamber portion to the second chamber portion. A first aperture in the top surface of the portable electronic device allows sound waves to emit from the front portion of the speaker. A second aperture in the top surface of the portable electronic device allows sound waves to emit from the back portion of the speaker through the first chamber portion and the second chamber portion. The sound waves from the front portion of the speaker and the sound waves from the back portion of the speaker are substantially in phase with each other when emitted from the first and second apertures.

13 Claims, 4 Drawing Sheets

OTHER PUBLICATIONS

Richard H. Small, Simplified Loudspeaker Measurements At Low Frequencies, Journal Of The Audio Engineering Society, vol. 20, No. 1, pp. 28–33 (Jan./Feb. 1972).

Richard H. Small, Direct–Radiator Loudspeaker System Analysis, Journal Of The Audio Engineering Society, vol. 20, No. 5, pp. 383–395 (Jun. 1972).

Richard H. Small, Closed Box Loudspeaker Systems Part I: Analysis, Journal Of The Audio Engineering Society, vol. 20, No. 10, pp. 798–808 (Dec. 1972).

James F. Novak, Performance Of Enclosures For Low-–Resonance High–Compliance Loudspeakers, IRE Transactions in Audio, vol. AU–7, pp. 5–13 (Jan.–Feb. 1959).

N. Thiele, Loudspeakers In Vented Boxes: Part I, Journal Of The Audio Engineering Society, vol. 19, No. 5, pp. 382–392 (May 1971).

N. Thiele, Loudspeakers In Vented Boxes: Part II, Journal Of The Audio Engineering Society, vol. 19, No. 6, pp. 471–483 (Jun. 1971).

Richard H. Small, Vented Box Loudspeaker Systems Part III: Synthesis, Journal Of The Audio Engineering Society, vol. 21, No. 7, pp. 549–554 (Sep. 1973).

Richard H. Small, Vented Box Loudspeaker Systems Part IV: Appendices, Journal Of The Audio Engineering Society, vol. 21, No. 8, pp. 635–639 (Oct. 1973).

PORTABLE ELECTRONIC DEVICE HAVING A PORTED SPEAKER ENCLOSURE

FIELD OF THE INVENTION

This invention relates to the electronics circuitry field. More particularly, this invention is a portable electronic device having a ported speaker enclosure.

BACKGROUND OF THE INVENTION

Portable electronic devices, such as portable personal computers, have decreased fairly dramatically in size in the last few years. Early portable computers weighed over twenty pounds and more realistically resembled a desktop computer with a handle—thereby allowing the computer to be lugged around only by the strong and the truly sadistic. In contrast, today's laptop and subnotebook computers can weigh less than three pounds, can easily fit in a briefcase and are truly portable. While the decrease in size of portable personal computers has been a boon to business travelers, it has not been without its problems.

One such problem is that as a computer or other electronic device gets smaller, many of the components contained in the computer or other electronic device must also get smaller. Examples of components that have shrunk along with the device is the circuitry, the hard disk storage, and the speaker. The reduction in the size of the circuitry and the hard disk storage has not been much of a problem, since technological advancements in these areas has allowed equal or better functionality to be present in smaller sizes than what was previously available in the larger sizes.

The reduction in the size of the speaker, on the other hand, has caused more severe problems. As the speaker gets smaller, the maximum power the speaker can handle also gets smaller, thereby reducing the loudness and quality of sound the speaker can produce. In addition, the low frequency response of small speakers must be traded off against the maximum power the speaker can handle because of the physical movement of the speaker's coil at low frequencies. The low power and poor low frequency response of small speakers is wholly unacceptable in today's portable computers and other electronic devices where sound is important, such as when running today's sound intensive multimedia applications.

One prior attempt to solve this problem is disclosed in U.S. Pat. No. 4,727,583 to Weber. This patent discloses a thin speaker contained in a housing in a telephone handset, wherein the speaker cavity is dimensioned to move the resonant frequency of the speaker/housing combination up to approximately the free air cutoff frequency of the speaker. The resulting response then falls off at about 6 db/octave below that point. An amplifier having gain increasing at 6 db/octave is placed in the signal input path for creating an essentially flat frequency response in the normally desired audio range. While Weber's device does appear to increase this low frequency range, it requires extra circuitry to accomplish this result, thereby undesirably increasing the size and cost of the electronic device.

Front to back cancellation of relatively low frequency sound is a fundamental problem of large standalone moving diaphragm loudspeakers. Designers of large standalone loudspeakers normally address this problem by sealing the sound from the back of the speaker in a volume of air. Another common approach follows the early research of James F. Novak, A. N. Thiele, and Richard H. Small, who have theorized since the late 1950s that the operation of large standalone loudspeakers would be enhanced if they provided a vent or port for the phase corrected sounds coming from the back of the loudspeaker.

The following articles are representative of their research:
1. James F. Novak, Performance of Enclosures for Low-Resonance High-Compliance Loudspeakers, *IRE Transactions in Audio*, Vol. AU-7, pp. 5–13 (Jan–Feb 1959).
2. N. Thiele, Loudspeakers in Vented Boxes: Part I, *Journal of the Audio Engineering Society*, Vol. 19, No. 5, pp. 382–392 (May 1971).
3. N. Thiele, Loudspeakers in Vented Boxes: Part II, *Journal of the Audio Engineering Society*, Vol. 19, No. 6, pp. 471–483 (June 1971).
4. Richard H. Small, Simplified Loudspeaker Measurements at Low Frequencies, *Journal of the Audio Engineering Society*, Vol. 20, No. 1, pp. 28–33 (Jan/Feb 1972).
5. Richard H. Small, Direct-Radiator Loudspeaker System Analysis, *Journal of the Audio Engineering Society*, Vol. 20, No. 5, pp. 383–395 (June 1972).
6. Richard H. Small, Closed Box Loudspeaker Systems Part I: Analysis, *Journal of the Audio Engineering Society*, Vol. 20, No. 10, pp. 798–808 (December 1972).
7. Richard H. Small, Closed Box Loudspeaker Systems Part II: Synthesis, *Journal of the Audio Engineering Society*, Vol. 21, No. 1, pp. 11–18 (Jan/Feb 1973).
8. Richard H. Small, Vented Box Loudspeaker Systems Part I: Small-Signal Analysis, *Journal of the Audio Engineering Society*, Vol. 21, No. 5, pp. 363–372 (June 1973).
9. Richard H. Small, Vented Box Loudspeaker Systems Part II: Large-Signal Analysis, *Journal of the Audio Engineering Society*, Vol. 21, No. 6, pp. 438–444 (July/August 1973).
10. Richard H. Small, Vented Box Loudspeaker Systems Part III: Synthesis, *Journal of the Audio Engineering Society*, Vol. 21, No. 7, pp. 549–554 (September 1973).
11. Richard H. Small, Vented Box Loudspeaker Systems Part IV: Appendices, *Journal of the Audio Engineering Society*, Vol. 21, No. 8, pp. 635–639 (October 1973).

While the work of these researchers contemplated the practical use of their theories in large, standalone loudspeakers, they failed to contemplate how, or even if, these theories would find practical applicability in small speakers enclosed in a portable electronic device. Likewise, designers of small portable electronic devices have thus far failed to contemplate how, or even if, the theories of these researchers could find practical applicability in small speakers enclosed in a portable electronic device.

SUMMARY OF THE INVENTION

A portable electronic device, such as a portable personal computer, has a ported speaker enclosure. The ported speaker enclosure has a speaker having a front portion and a back portion, where the front portion of the speaker forms a seal with a top surface of the portable electronic device, and the back portion of the speaker is contained in the ported speaker enclosure. An acoustic insulator, such as a gasket, is disposed between the top surface of the portable electronic device and the bottom surface of the ported speaker enclosure, thereby forming one chamber portion on one side of the acoustic insulator and a second chamber portion on the other side of the acoustic insulator. The acoustic insulator has a gap which allows for sound to travel from the first chamber portion to the second chamber portion. A first aperture in the top surface of the portable electronic device allows sound waves to emit from the front portion of the speaker. A second aperture in the top surface of the portable electronic device allows sound waves to emit from the back portion of the speaker through the first chamber portion and the second chamber portion. The sound waves from the front portion of the speaker and the sound waves from the back portion of the speaker are substantially in phase with each other when emitted from the first and second apertures.

DETAILED DESCRIPTION OF THE PREFERRED EMBODIMENT

Figure 1:
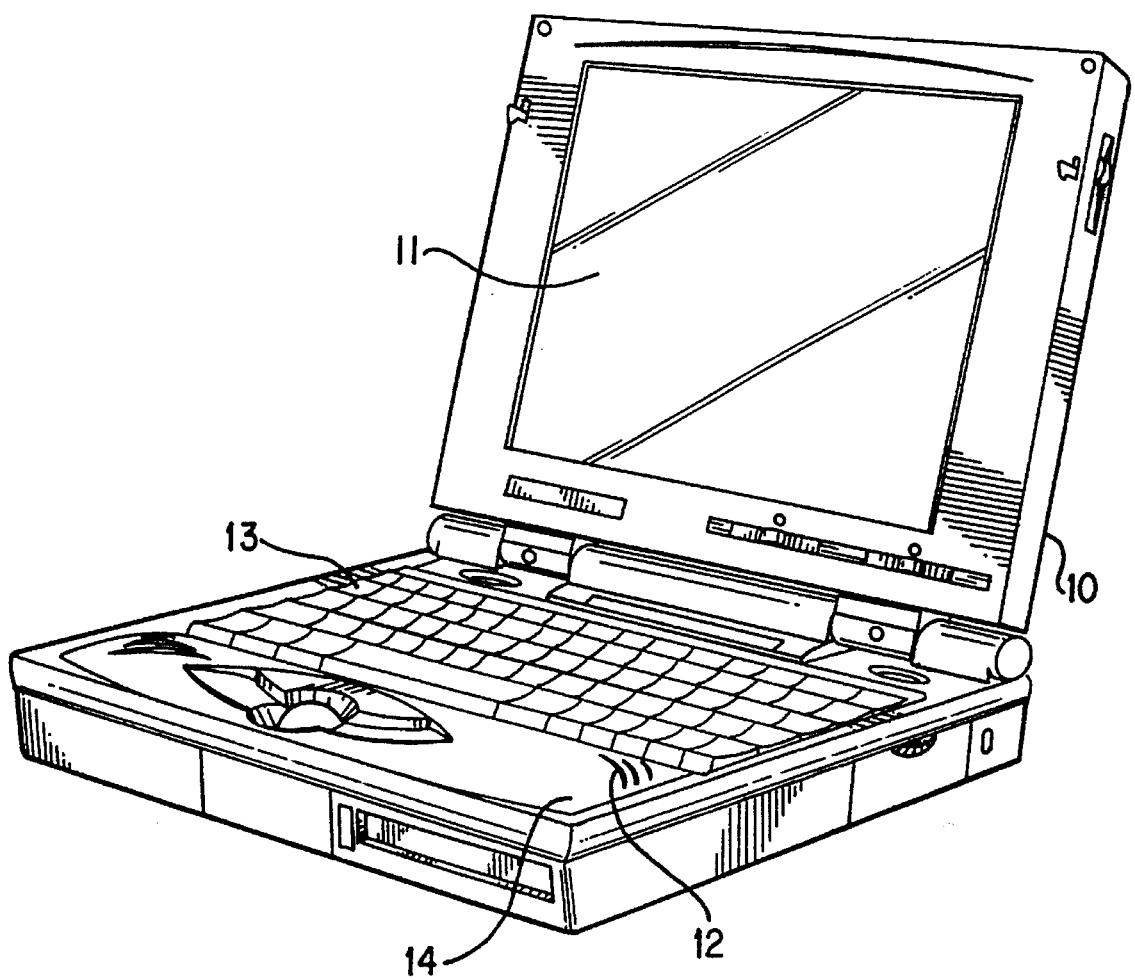
FIG. 1 shows a portable electronic device using a conventional sealed speaker enclosure.
Figure 2:
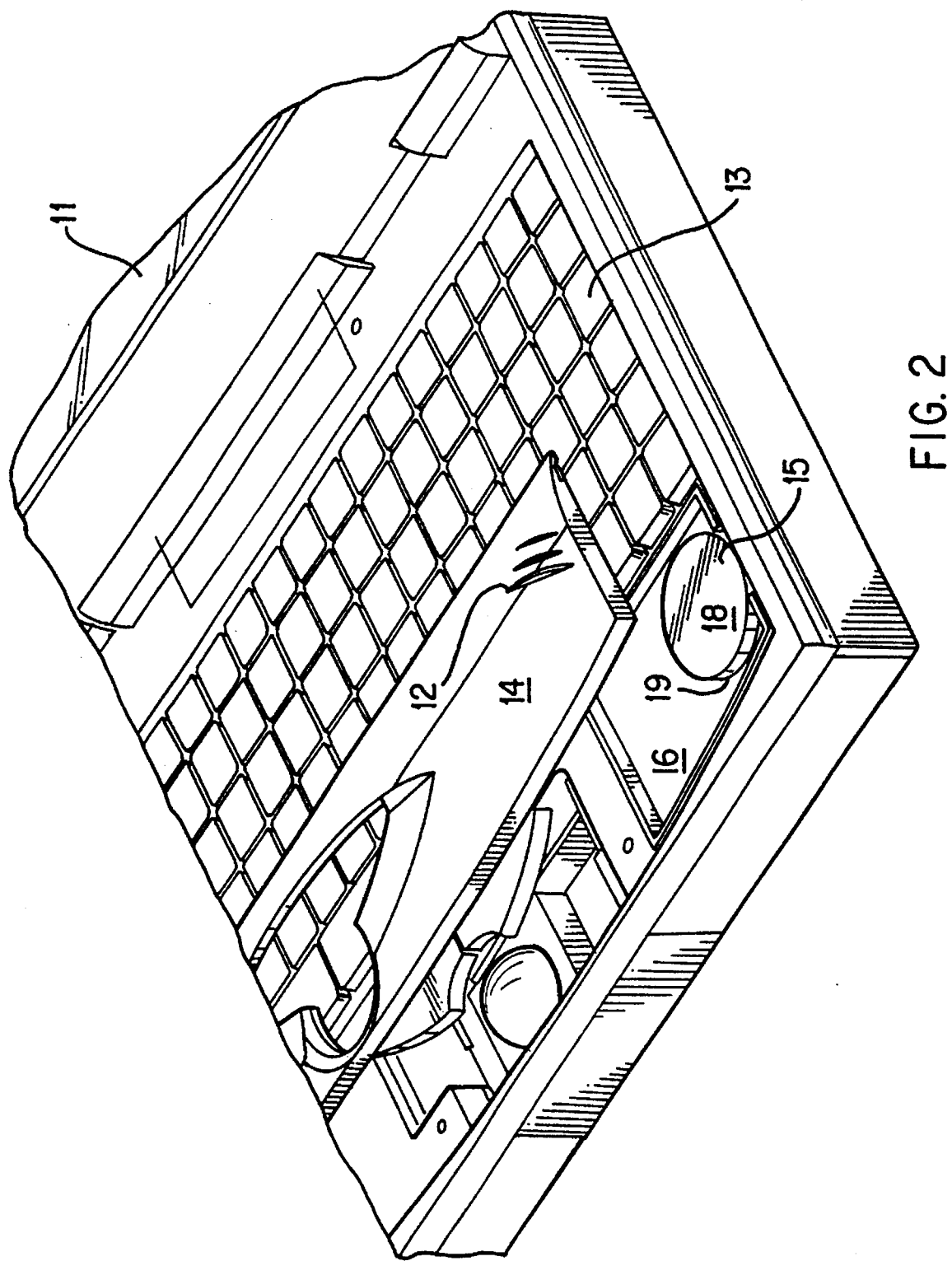
FIG. 2 shows an exploded view of a portion of the portable electronic device of FIG. 1.

FIGS. 1 and 2 show a portable electronic device and an exploded view of a portion of the portable electronic device using a conventional sealed speaker enclosure. Portable computer 10 (shown here as a Hewlett-Packard OmniBook 4000 laptop computer) has aperture 12 contained in a first surface, shown herein as top surface 14. Portable computer 10 also has display 11 and keyboard 13. Speaker 15 (FIG. 2) is mounted directly underneath aperture 12 so that sound from front portion 18 of speaker 15 is emitted through aperture 12 of top surface 14. Sound from back portion 19 of speaker 15 is trapped between bottom enclosure surface 16 and top, surface 14. Since sound from back portion 19 of speaker 15 is trapped, it cannot wrap around to the front of speaker 15 and cancel out low frequency sounds coming from front portion 18 of speaker 15. Speaker 15 is therefore considered to be in a sealed enclosure, with the air between bottom enclosure surface 16 and top surface 14 acting as a spring in an air suspension system.

The maximum power that can be supplied to speaker 15 is determined by the maximum excursion of the diaphragm in speaker 15. A. N. Thiele discovered that the maximum excursion of the diaphragm of a speaker in a sealed enclosure occurs at the resonant frequency of the speaker. For a speaker having a resonant frequency of 356 Hz, as would be typical for speaker 15 mounted in a sealed enclosure, the maximum power of this speaker would typically be around 0.2 Watts.

Figure 3:
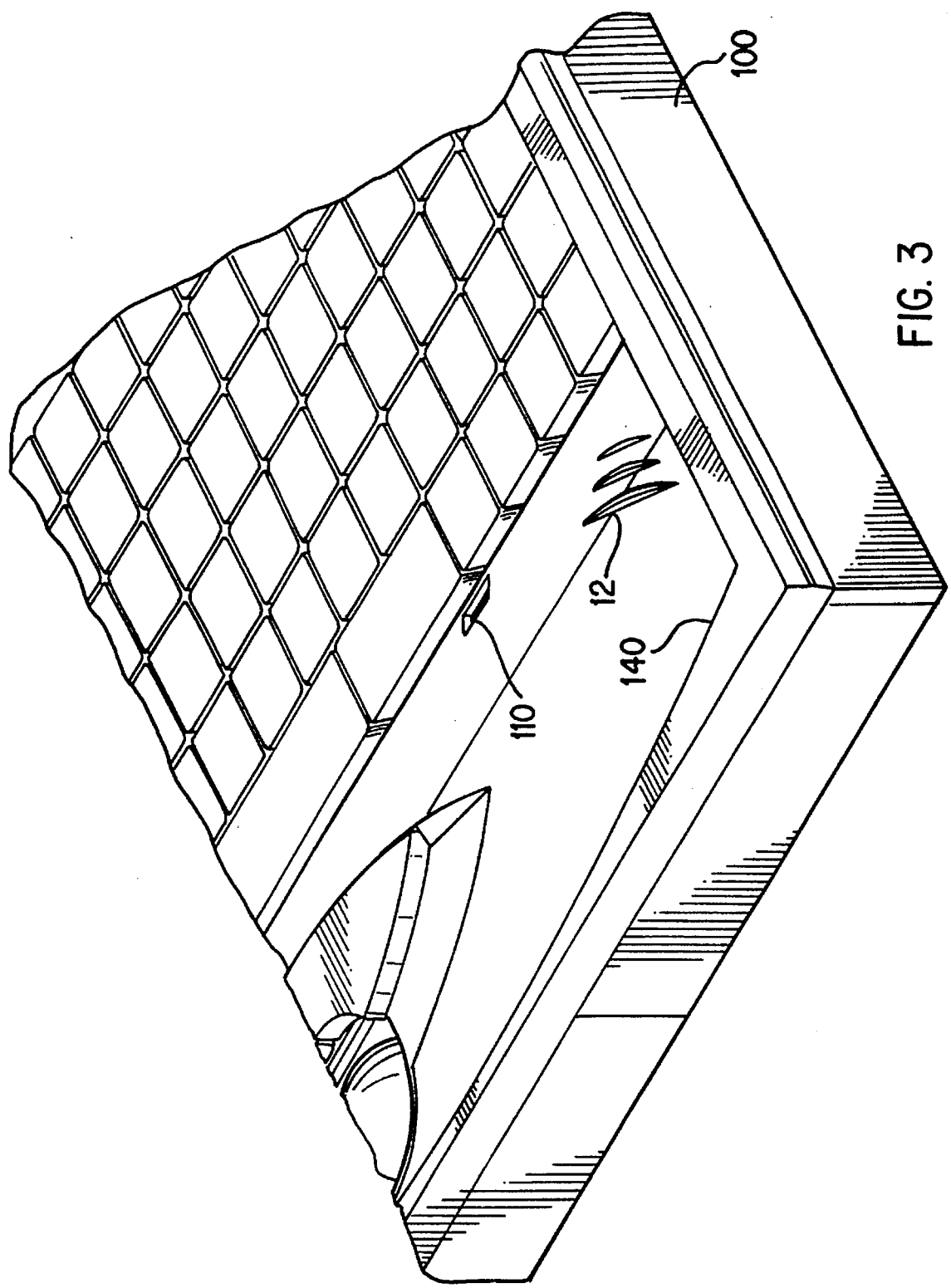
FIG. 3 shows the portable electronic device of the preferred embodiment of the invention.
Figure 4:
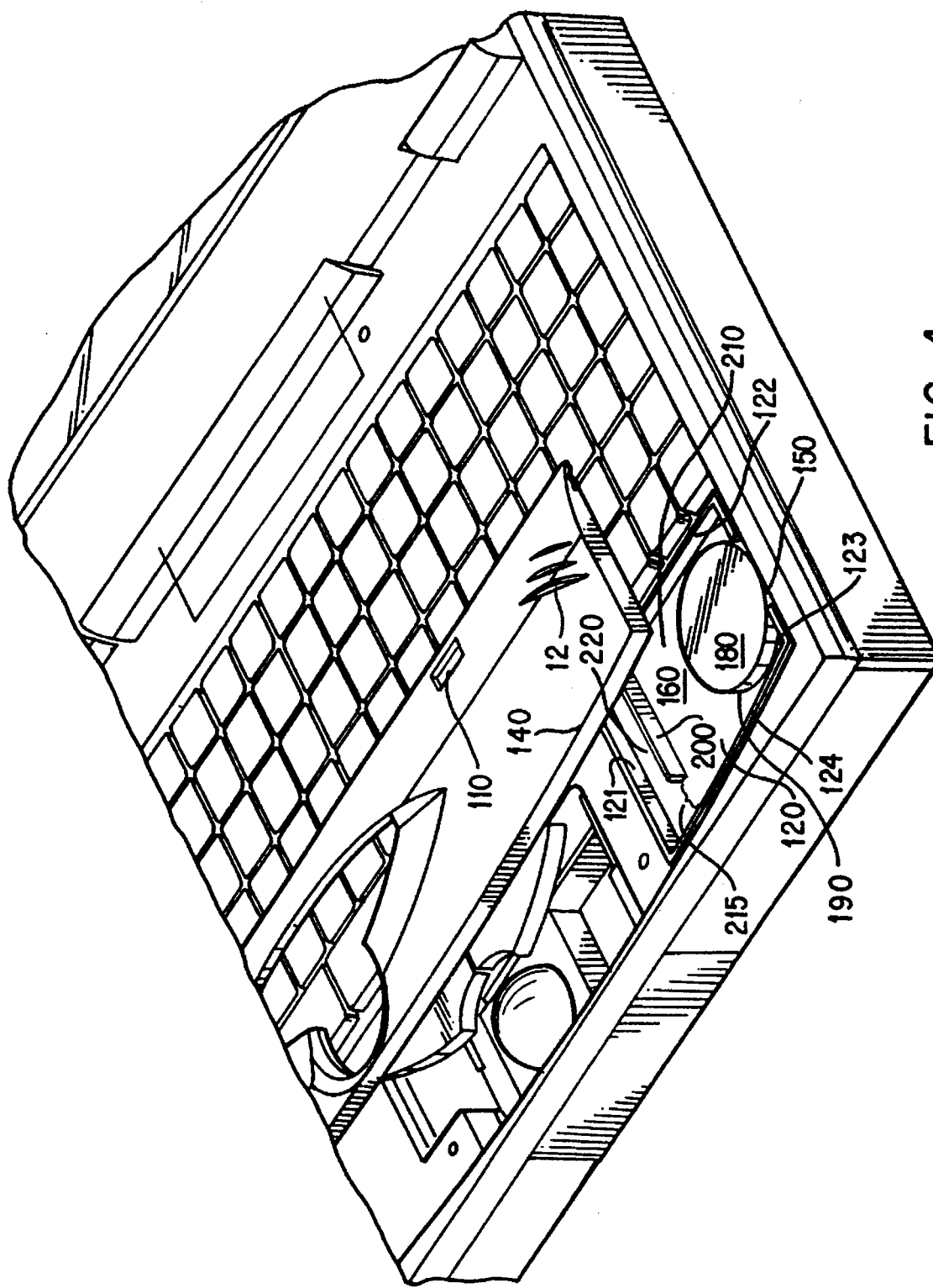
FIG. 4 shows an exploded view of a portion of the portable electronic device of FIG. 3.

FIGS. 3 and 4 show a portable electronic device and an exploded view of a portion of the portable electronic device of the preferred embodiment of the invention. In the preferred embodiment, portable computer 100 is the Hewlett-Packard OmniBook 4000 laptop computer shown in FIG. 1 modified as described and shown herein. Like portable computer 10 of FIG. 1, portable computer 100 has aperture 12 contained in top surface 140. But unlike portable computer 10, portable computer 100 has a second aperture— aperture 110—also contained in top surface 140. In the preferred embodiment, top surface 140 is a palmrest for the keyboard of portable computer 100. This is an advantageous location to place apertures 12 and 110, since the area under palmrests is normally underutilized. The operation of aperture 110 will be described in more detail later. Like speaker 15 of FIG. 2, speaker 150 (FIG. 4) is mounted directly underneath aperture 12 so that sound from front portion 180 of speaker 150 is emitted through aperture 12 of top surface 140. In the preferred embodiment, top front portion 180 of speaker 150 abuts top surface 140, thereby forming a seal with top surface 140. Unlike speaker 15 of FIG. 2, the sound from back portion 190 of speaker 150 is not trapped between bottom enclosure surface 160 and top surface 140. Instead, the area between bottom enclosure surface 160 and top surface 140 within walls 121–124 forms ported speaker enclosure 120. Ported speaker enclosure 120 and top surface 140 are designed to allow sound waves to be emitted from back portion 190 of speaker 150 substantially in phase with sound waves from front portion 180 of speaker 150, in a manner that will now be discussed.

In addition to speaker 150, ported speaker enclosure 120 also contains acoustic insulator 200. In the preferred embodiment, acoustic insulator 200 is a soft elastometric gasket material, although other materials could also be used. Acoustic insulator 200 is disposed between top surface 140 and bottom enclosure surface 160, and divides ported speaker enclosure 120 into chamber portions 210 and 220. Acoustic insulator 200 does not extend from wall 122 to wall 124; instead, it stops before it reaches wall 124, leaving gap 215. Gap 215 in acoustic insulator 200 allows for sound from back portion 190 of speaker 150 to travel from first chamber 210 through gap 215 of acoustic insulator 200 to second chamber 220, before exiting through aperture 110 of top surface 140.

Chamber portion 210 of ported speaker enclosure 120 provides acoustical compliance for sound from back portion 190 of speaker 150, and chamber portion 220 provides an acoustical mass for sound from back portion 190 of speaker 150. In this case, chamber portions 210 and 220 delays the sound waves coming from back portion 190 of speaker 150, so that by the time they are emitted from aperture 110 of top surface 140, they are substantially in phase with sound waves emitted from front portion 190 of speaker 150 through aperture 12 of top surface 140.

The design of ported speaker enclosure 120 is highly dependent on two properties of the speaker selected as speaker 150: the resonant frequency ($f_s$) and the equivalent acoustic compliance ($V_{as}$). In the preferred embodiment, speaker 150 is a 36M1 speaker manufactured by the JSR company of Japan. The resonant frequency of this speaker is approximately 356 Hz. This property can be provided by the speaker manufacturer, or can be determined by measuring the point of maximum impedance of the speaker, which, according to Thiele and Small, provides an accurate indication of the resonant frequency. $V_{as}$ can also be provided by the speaker manufacturer, or can be determined by placing the speaker in a test box constructed in a manner known to those skilled in the art following the teachings of Thiele and Small and measuring the resonant frequency of the speaker in the test box and in free air, then calculating $V_{as}$ according to the following formula:

$$V_{as} = \left( \frac{f_b}{f_s} - 1 \right)^2 V_b \qquad (1)$$

$$V_{as} = 3.19 \text{ in}^3 \qquad (2)$$

Once $f_s$ and $V_{as}$ are determined, the volume of the acoustical compliance (chamber portion 210) can be calculated by using the following formula:

$$V = V_{as} / \frac{C_{as}}{C_{ab}} \qquad (3)$$

$C_{as}/C_{ab}$, the acoustic compliance of the driver suspension/ the acoustic compliance of air in the enclosure, can be determined by referring to Thiele's alignment table (reference 2, p. 388). Thiele's Alignment number 3, $QB_3$ is appropriate for speaker 150 (which is equivalent to a quasi-fourth order high pass Butterworth filter). The relevant portions of Thiele's alignment table is reproduced below for $QB_3$:

| Alignment Number | Alignment Type | $\frac{f_3}{f_s}$ | $\frac{f_3}{f_b}$ | $\frac{C_{as}}{C_{ab}}$ | $Q_r$ |
| --- | --- | --- | --- | --- | --- |
| 3 | $QB_3$ | 1.77 | 1.25 | 4.46 | .259 |

Using the above alignment table, Equation (3) becomes $$V = \frac{V_{as}}{4.46} \quad (4)$$

Substituting 3.19 $in^3$ for $V_{as}$, $$V = 0.716 \ in^3 \quad (5)$$

The length and surface area of the chamber portion 220 can be determined by the following equation:

$$\frac{L_v}{S_v} = \frac{1.84 \times 10^8}{(2\pi f_b)^2 V} \quad (6)$$

Using Thiele's alignment table to find that $f_b = 504.096$, $$\frac{L_v}{S_v} = 25.623 \quad (7)$$

Choosing a convenient size for $Sv=0.078 \ in^2$, and applying the end correction factor for a flared port, $$\left(\frac{L_v}{S_v}\right)_{end} = \frac{.823}{\sqrt{S_v}} = 2.947 \quad (8)$$

$$L_v = \left(\frac{L_v}{S_v} - \left(\frac{L_v}{S_v}\right)_{end}\right) * S_v = 1.769 \ in \quad (9)$$

As discussed above, the maximum power that can be supplied to a speaker is determined by the maximum excursion of the diaphragm in the speaker, and that the maximum excursion of the diaphragm occurs at the resonant frequency of the speaker when the speaker is mounted in an air suspension system. But when the speaker is mounted in a ported speaker enclosure, as is the case with speaker 150 in ported speaker enclosure 200, Thiele determined that the theoretical excursion of the diaphragm is zero at the resonant frequency. This property of speakers in ported enclosures can be used to boost the power input into speaker 150 visa vis speaker 15 theoretically indefinitely, although practical limitations limit the maximum power. For speaker 150 shown in enclosure 200, the maximum power is approximately 0.8 to 1.8 Watts—a big boost in performance over the 0.2 Watts maximum power of speaker 15. This boost in performance allows portable computer device 100 to be much more useful in sound important applications, such as multimedia applications, than portable computer device 10.

What is claimed is:

1. A portable electronic device having a first surface, said portable electronic device comprising:
   a ported speaker enclosure, said ported speaker enclose comprising:
      a speaker having a front portion and a back portion, said front portion of said speaker forming a first seal with said first surface of said portable electronic device, said back portion of said speaker forming a second seal with a second surface of said ported speaker enclosure;
      an acoustic insulator disposed between said first surface of said portable electronic device and said second surface of said ported speaker enclosure wherein a first chamber portion is formed on one side of said acoustic insulator and a second chamber portion is formed on the other side of said acoustic insulator, said acoustic insulator having a gap that allows sound to travel from said first chamber portion to said second chamber portion;
      said first chamber portion having a first chamber area;
      said second chamber portion having a second chamber cross sectional area and a second chamber length;
   a first aperture in said first surface of said portable electronic device to allow sound waves to emit from the front portion of said speaker;
   a second aperture in said first surface of said portable electronic device to allow sound waves to emit from the back portion of said speaker through said first chamber portion and said second chamber portion;
   said sound waves from said front portion of said speaker and said sound waves from said back portion of said speaker being substantially in phase with each other when emitted from the first and second apertures.

2. The portable electronic device of claim 1, wherein said first chamber area is determined from the resonant frequency of said speaker and the equivalent acoustic compliance of said speaker.

3. The portable electronic device of claim 1, wherein said second chamber cross sectional area is determined from the resonant frequency of said speaker and the equivalent acoustic compliance of said speaker.

4. The portable electronic device of claim 1, wherein said second chamber length is determined from the resonant frequency of said speaker and the equivalent acoustic compliance of said speaker.

5. The portable electronic device of claim 1, wherein the portable electronic device is a portable computer.

6. The portable electronic device of claim 1, wherein the top surface of the portable electronic device is a palmrest.

7. The portable electronic device of claim 2, wherein said first chamber area is less than 0.75 cubic inches.

8. The portable electronic device of claim 3, wherein said second chamber cross sectional area is less than 0.08 square inches.

9. The portable electronic device of claim 4, wherein said second chamber length is less than 1.8 inches.

10. The portable electronic device of claim 1, wherein the maximum power of said speaker is more than 0.8 Watts.

11. The portable electronic device of claim 1, wherein said acoustic insulator is a gasket.

12. A portable computer having a display, a keyboard, and a palmrest, said portable computer comprising:
   a ported speaker enclosure, said porter speaker enclose comprising:
      a speaker having a front portion and a back portion, said front portion of said speaker forming a first seal with said palmrest, said back portion of said speaker forming a second seal with a bottom enclosure surface of said ported speaker enclosure;
      an acoustic insulator disposed between said palmrest and said bottom enclosure surface of said ported speaker enclosure wherein a first chamber portion is formed on one side of said acoustic insulator and a second chamber portion is formed on the other side of said acoustic insulator, said acoustic insulator having a gap that allows sound to travel from said first chamber portion to said second chamber portion;
      said first chamber portion having a first chamber area, wherein said first chamber area is determined from the resonant frequency of said speaker and the equivalent acoustic compliance of said speaker;

said second chamber portion having a second chamber cross sectional area and a second chamber length, wherein said second chamber cross sectional area and second chamber length are determined from the resonant frequency of said speaker and the equivalent acoustic compliance of said speaker;

a first aperture in said palmrest of said portable electronic device to allow sound waves to emit from the front portion of said speaker;

a second aperture in said palmrest of said portable electronic device to allow sound waves to emit from the back portion of said speaker through said first chamber portion and said second chamber portion;

said sound waves from said front portion of said speaker and said sound waves from said back portion of said speaker being substantially in phase with each other when emitted from the first and second apertures.

13. The portable computer of claim 12, wherein said acoustic insulator is a gasket.

* * * * *